United States Patent Office 3,317,368
Patented May 2, 1967

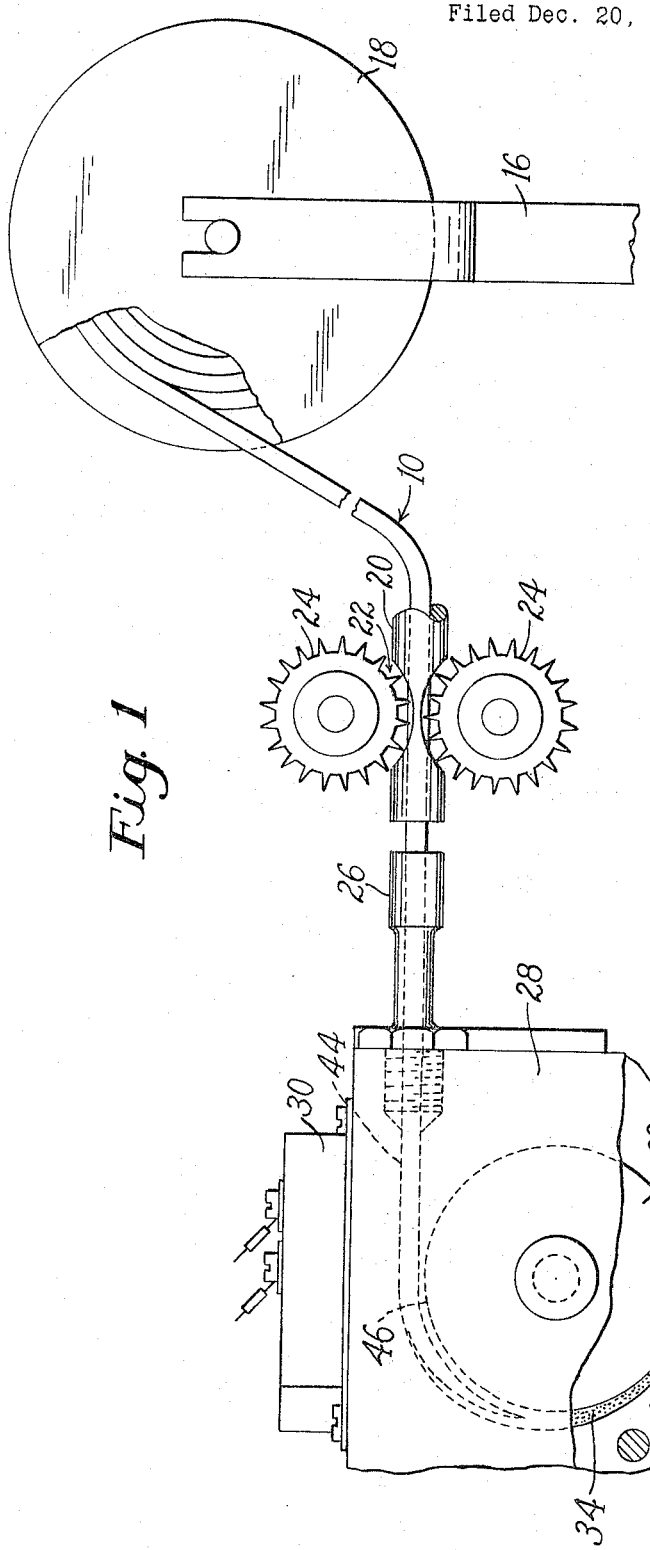
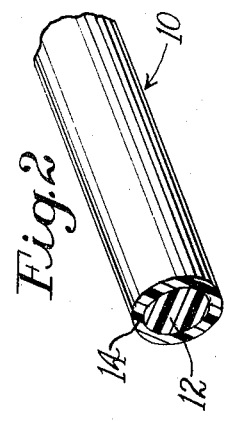

3,317,368
COMPOSITE THERMOPLASTIC ADHESIVES
William R. Battersby, Lexington, Mass., assignor to United Shoe Machinery Corporation, Flemington, N.J., a corporation of New Jersey
Filed Dec. 20, 1963, Ser. No. 332,009
6 Claims. (Cl. 161—175)

This invention relates to a heat-fusible adhesive supply article.

An adhesive system in which a slender rod or strand of adhesive in coil form is used as an adhesive supply reservoir in a direct through feed adhesive dispensing system provides many advantages. Through use of the system the glue pot type of adhesive reservoir with its attendant mess and thermal degradation of adhesive material is avoided. However, the requirements that the rod or strand be sufficiently stiff to be fed longitudinally but adequately flexible to be coiled for storage and uncoiled for use without cracking and without blocking or adhesion together of adjacent rods or strands on the coil impose certain limitations on the adhesive materials heretofore usable in rod or strand form. In particular, it has been found that adhesive materials usable in homogeneous rods or strands are more viscous in molten form and/or have higher melting points than is desirable for some bonding operations.

It is an object of the present invention to provide a slender flexible rod or strand of adhesive capable of being coiled and uncoiled for use in a direct through feed adhesive melting and applying system in which there may be used adhesive components which are lacking in the required combination of properties of freedom from tack, dimensional stability, shape retention and resistance to degradation by exposure for use in a homogeneous rod or strand.

To this end and in accordance with a feature of the present invention there is provided a composite rod of which a longitudinally extending central portion may be any normally solid adhesive material and on which there is provided a non-tacky flexible external layer surrounding the central portion supplying in association with the central portion physical characteristics enabling the rod to be coiled, stored and uncoiled and handled in a direct through feed system.

The rod or strand adhesive article of the present invention is in effect a dual rod comprising a central portion constituting a major percentage of the total volume of the rod and an external portion surrounding the central portion. Use of the rod involves melting and mixing together the central portion and external portion to form a composition possessing effective adhesive properties.

The invention will be described further in connection with the attached drawings of which:

FIG. 1 is a diagrammatic elevational view with parts broken away showing a direct through feed adhesive handling and applying system employing a dual rod according to the present invention; and FIG. 2 is a fractional perspective view of a portion of a dual rod on a somewhat enlarged scale.

The adhesive rod 10 of the present invention comprises a longitudinally extending central portion 12 and an external layer 14 surrounding the central portion. The rod may be melted and applied as an adhesive to workpieces by a variety of machines; but for purposes of convenience and to aid in the exposition of the invention the rod will be described in relation to the machine shown in FIG. 1. This machine comprises a support 16 on which a reel 18 of the rod material is mounted and a feed mechanism comprising a guide tube 20 through which the rod 10 passes, the tube 20 being cut away at 22 to permit engagement of the rod by coacting feed wheels 24 which pass the rod along through an entrance gland 26 to the melter applicator device. This device comprises a casing 28 electrically heated by a heating unit 30 within which casing is disposed a driven disk 32 partly surrounded by a passage 34 extending from the entrance gland 26 to an outlet 36 where the melted cement is received by a gear pump 38 and forced through a passage 40 to the point of application to a workpiece 42. An initial portion 44 of the passage 34 is cylindrical for reception of the cold rod 10; but the passage from a point 46 near the top of the disk 32 to a point 48 at the bottom adjacent the outlet opening 36 is rectangular in cross section and gradually tapered. The passage extends around the left hand portion of the periphery of the disk 32 as seen in FIG. 1 so that the disk is in contact with the cement along about half of its periphery at any precise time. This disk 32 both supplies heat to melt the material since it picks up heat from the casing 28 and gives it up to the cement, and also assists in carrying the cement along the passage 34 as the material melts. Molten material leaving passage 34 through the outlet 36 enters the gear pump 38 which is useful not only in insuring the desired rate of delivery of molten cement but also, because of the intermeshing of the teeth of the pump in giving a desirable final mixing of the cement components.

In the melting and dispensing of an adhesive rod 10 in a direct through feed system as shown in FIG. 1 the entire cross section of the rod 10 is melted in the course of passing through the system, the materials of the central portion 12 and of the external layer 14 of each segment of the rod 10 progressing through the system substantially in the order in which the segments enter the system. The molten component of the central portion 12 and external layer 14 are mixed in the course of moving through passage 34 to outlet passageway 36 by the action of the rotary disc 32 and frictional engagement with the side of the passage 34. The composition may receive further mixing if desired either by the pump 38 or by a special mixer (not shown) and the molten adhesive dispensed from the system is the total of the composition across any section of the rod. The properties of the dispensed adhesive then are determinable by controlling the character and relative areas of cross sections of the central portion 12 and external layer 14. In general, the cross sectional area of the external layer 14 should be at least about 15% of the total area and for most systems it is preferred that the area of the external layer 14 not exceed about 50%.

Effective handling of the adhesive requires that the external layer 14 be substantially non-tacky so as to be readily uncoiled from a reel 18 and also calls for dimension and shape retaining stability of the external layer 14 as backed up by the central portion. This layer 14 accepts the thrust needed for feeding the rod or strand into the dispensing device for example, by means of the tooth wheels 24 and aids in retaining the shape corresponding to the entranec port or gland 26 of the melting and dispensing device for effective adhesive feeding. A relatively thin external layer 14 may be used where the central portion 12 is firm and shape retaining, or where the material of the external layer is more firm. A thicker external layer 14 will be required where the central portion 12 is softer or where the material of the external layer itself is relatively soft.

By proper selection of thickness and material of the external layer 14 it thus becomes possible to use almost any solid heat-fusible material in the central portion 12. For example extremely soft materials with poor shape retaining ability or with tacky surfaces may be used in association with an external layer providing necessary stiffness and shape retention ability. On the other hand relatively hard but brittle material may be used in the central portion without disruption of operation through cracking of the rod or strand in unreeling and handling by providing a tough flexible external layer to hold the central portion together even in the event the central portion becomes cracked.

A great latitude in adhesive bonding operations is made possible by the ability to use such soft or brittle materials heretofore incapable of such operations when used alone. For example, it is possible to provide a dual rod of which the adhesive obtained for melting and mixing the rod is much more fluid or fluid at lower temperatures than previously possible. It is possible to use materials possessing specific adhesive or wetting action which were previously physicaly unsuitable for use in rod form. It is possible to provide a central portion of a plasticizer for the external portion where the composite mixture of the material of the external layer 14 and the desired high plasticizer content would be unsuitable physically for use as a rod or strand adhesive. It is even possible to use a central portion 12 and an external layer 14 which, although reactive with each other if mixed at elevated temperatures, for example, in the course of melting and application, do not react at normal temperatures in the association of central portion 12 and external layer 14. In a further system the external layer 14 may protect the central portion 12 from degradation by for example, oxygen, moisture, or radiation, until point of use. Other combinations of central portion and external layer will achieve still other advantages.

The dual rod may be formed by various procedures as by extrusion, drawing or the like. That is, in the extrusion manufacture of such a dual rod the central portion 12 may be extruded from a central extrusion orifice and the external layer may be extruded around the central portion using an annular extrusion orifice. Other useful procedures are the formation of a central portion and a tubular external portion and inserting the central portion into the external portion. If desired, and the known properties permit, a relatively thick dual rod may be stretched to form a dual rod of the desired dimensions. Other known procedures of providing a suitable layer such as application of a solution, latex, plastisol or organisol to form the external layer may be used.

As regards the relative natures of the materials of the central portion and of the external layer it is ordinarily desired that these materials be miscible in molten condition, but this is not essential since for some purposes a uniform dispersion of one material in a continuous phase of the other in which it is immiscible or not completely miscible may be desirable. The external layer must, of course, have a melting point high enough to resist blocking and to be dimensionally stable under normal storage, handling and feeding conditions but it may have a melting point significantly above or below the melting point of the central portion. As a further advantage, particularly where the materials are miscible, the molten material from fusion of one of the portions may be effective to dissolve the second portion at a temperature below the melting point of the second portion.

The following examples are given to aid in understanding the invention but it is to be understood that the invention is not restricted to the materials or proportions of the examples.

*Example I*

10 parts of a copolymer of 60 parts ethylene and 40 parts vinyl acetate having a melt index of 40 was introduced into a Reed Mixer and melted by bringing its temperature to 150° C. 90 parts of a normally soft and tacky thermoplastic saturated hydrocarbon resin having a melting point of 47° C. and a specific gravity of 1.02 (Stikvel W) was then added and mixed in. Thereafter, the temperature was lowered to about 100° C. and subjected to a short further mixing. This material at room temperature was a tacky relatively soft mass having some tendency to flow under its own weight.

The mixture was heated and supplied at a temperature of about 110° C. to the inner orifice of a special extrusion device, and polyethylene having a molecular weight of 20,000 and a melting point of about 110° C. was supplied and extruded at a temperature of 120° C. through an extrusion orifice surrounding the inner orifice and defining with the inner orifice an annular passage. The material extruded from the inner orifice constituted a central portion and the material from the annular passage constituted an external layer of a dual rod. The relative rates of extrusion were controlled to provide a ratio by weight of external layer to central portion of 25:75. The inner orifice was about ¼ inch in internal diameter and the outer orifice was about ⅜ inch in internal diameter. From the orifices the extruded dual rod passed to a cooling water bath and was drawn to an outer diameter of about 0.20 inch, the external layer having a thickness of about 0.017 inch. The cooled dual rod was coiled onto a flanged reel having a core diameter of about 3 inches. The dual rod was non-tacky, resiliently flexible, dimensionally stable and shape retaining when stored at temperatures up to about 125° F.

The rod was fed to a through feed melting, dispensing and applying device where successive portions of the dual rod were melted and carried through the machine. The material discharged from the machine was found to have been thoroughly mixed in the course of flowing through the heated passage and being pumped by the gear pump of the device. The mixture of central portion and external layer had a melting point of 103° C. and the viscosity of the molten mixture at 190° C. was 7600 cps. as determined with the Castor-Severs Extrusion Rheometer using an extrusion rate of 50 reciprocal seconds. Even at 150° C. the viscosity was only 17,300 cps. at the same extrusion rate. The material was applied for bonding paper to paper using an application temperature of about 350° F. to 375° F. The portions of paper were strongly bonded together.

*Example II*

The mixture of ethylene copolymer and saturated hydrocarbon resin and the polyethylene as used in Example I were supplied to the extrusion device, but the relative rate of extrusion was changed to form a dual rod in which the ratio by weight of external layer to central portion was 20:80 rather than the 25:75 of Example I. The result of the change in relative proportions was to reduce the melting point of the mixture to the range of 68° C. to 86° C. and to reduce the viscosity so that at 190° C. it was 6300 cps. and at 150° C. was 14,900. This material also was useful for bonding paper to paper and had a slightly longer open time than the material of Example I.

*Example III*

35 parts by weight of a copolymer of ethylene and vinyl acetate as used in Example I was introduced into a Reed Mixer and melted by bringing its temperature to 150° C. 50 parts by weight of a polymer of styrene having a molecular weight of about 400, a melting point of 75° C. and a specific gravity of about 1.05, and 15 parts by weight of a polymer of styrene having a molecular weight of about 300, a specific gravity of 1.02 and a melting point of 5° C. were then added and mixed in. This material was soft and extremely tacky.

A second mixture was prepared by a similar procedure in which 20 parts by weight of a copolymer of ethylene and ethyl acrylate in the ratio of about 75:25, having a molecular weight of 300,000, a melt viscosity of 400,000 cps. as determined at 190° C. and a shearing rate of 20 reciprocal seconds on the Castor-Severs Extrusion Rheometer and a melt index of 25 was introduced into a Reed Mixer and melted by bringing its temperature to 175° C. 30 parts of a polymer of beta pinene having a melting point of 115° C. was introduced into the mixture and finally 50 parts by weight of polyethylene having a molecular weight of 20,000 was introduced and mixing continued to form a homogeneous mass.

The mixtures were separately heated and supplied at a temperature of about 120° C., the first mixture to the inner orifice and the second mixture to the annular passage for extrusion as a dual rod, the relative rates of extrusion being controlled to provide a ratio by weight in the total rod of 75% of the total weight in the central portion and 25% by weight in the external layer. The extruded rod was drawn to an outer diameter of about 0.20 inch, cooled in a water bath and coiled on a flanged reel as in Example I. The dual rod was non-tacky, resiliently flexible, dimensionally stable and shape retaining when stored at temperatures up to about 125° F.

The rod was fed to a through feed melting, dispensing and applying device where successive portions of the dual rod were melted and carried through the machine. The molten adhesive was useful for paper to paper adhesion and also useful for bonding plastic films such as Saran or polyethylene, metal, metal foil and in general, was effective to provide adhesion to most surfaces. The mixture was a pressure-sensitive adhesive at room temperature and was used to form pressure-sensitive adhesive coatings. The melting point of the mixture was 85° C. to 90° C. (Ball and Ring).

*Example IV*

90 parts by weight of polyvinyl acetate having a softening point of 65° C. and an intrinsic viscosity of 1.35 to 1.65 cps. in a benzene solution containing 86 grams of resin per 1000 cc. of solution and determined at 20° C. with an Ostwald Viscosimeter, was introduced into a Reed Mixer and melted at 100° C. 10 parts by weight of dibutyl phthalate were added and mixed in with reduction of the temperature 75° C. This mixture was soft and exhibited marked cold flow. Also the mixture was quite tacky.

The mixture was supplied for extrusion at the inner orifice of an extrusion device for extrusion at 90° C. to 100° C. Polyethylene having a molecular weight of about 20,000 was supplied to the annular space of the extrusion device for extrusion at 120° C. The resultant rod was drawn, water cooled and coiled as in Example I.

The rod was supplied to a through feed melting, dispensing and applying device maintained at 300° F. to 350° F. and was used for bonding paper to paper.

*Example V*

A polyamide from the reaction of polymerized fatty acid from soybean oil with ethylene diamine and having an acid number of about 7, a specific gravity of 0.917, an average molecular weight of 3000 to 6500 and a ball and ring softening point (ASTM) of 105° C. to 115° C. was supplied to the annular space of the extrusion device for extrusion at 120° C., and the ethylene copolymer and hydrocarbon resin mixture of Example I was supplied to the inner orifice for extrusion at 110° C. Rates of extrusion were controlled to provide a dual rod of which the central portion constituted 65% and the external layer constituted 35% of the total weight of the rod. The rod was drawn, cooled in water, and coiled on a reel as in Example I.

The material was supplied from the reel to a through feed melting dispensing and applying device maintained at a temperature of 275° F. to 325° F. was effective for bonding paper and leather.

*Example VI*

26 parts by weight of a polymer of beta-pinene having a melting point of about 115° C. was introduced into a Reed Mixer and heated to a temperature of 300° F. When the polybeta-pinene had melted, there was introduced 20 parts by weight of a copolymer of about 98% isobutylene and about 2% isoprene ("butyl rubber"). The materials were thoroughly mixed mixed at a temperature of 300° F. to 350° F. and there were then added 10 parts by weight of the same polyamide as used in Example V. When mixing was complete, the temperature was dropped to 300° F. and 7 parts by weight of an epoxide resin having an epoxy equivalent of 875 to 1025, a melting point of 95° to 105° C. and a viscosity (40% solution in diethylene glycol monobutyl ether) of from 4.6 to 6.6 poises at 25° C., and 2 parts by weight of an antioxidant (2,6-di-tertiary-butyl phenol) were added and thoroughly mixed in. This mixture was a soft, rubbery tacky material. This material was supplied to the inner orifice of the extrusion device for extrusion at 275° F.; and polyethylene having a molecular weight of 18,000 was supplied to the annular orifice for extrusion at 275° F. The relative extrusion rates of the central portion and of the external layer were controlled to provide a ratio by weight of 65:35. The extruded dual rod was drawn, cooled and coiled as in Example I. The dual rod was supplied to a through feed melting, dispensing and applying device maintained at a temperature of 350° F. to 400° F. for application as an adhesive in the bonding of paper, aluminium foil, or foil laminated to paper products. The resultant bonds were excellent.

*Example VII*

WW Rosin was melted and supplied to the inner orifice of the extrusion device for extrusion at 90° C. and polyethylene having a molecular weight of 20,000 was supplied to the annular orifice for extrusion at 110° C. The relative extrusion rates of the central portion and of the external layer were controlled to provide a ratio by weight of 70:30. The extruded dual rod was drawn, cooled and coiled as in Example I. The dual rod when cold was flexible although the central portion crumbled if more than a slight bend was made, but this crumbling did not disrupt the continuity of the rod. The dual rod was supplied to a through feed melting, dispensing and applying device maintained at a temperature of 250° F. to 300° F. for application as an adhesive in the bonding of paper.

Having thus described my invention, what I claim as new and desire to secure by Letters Patent of the United States is:

1. As an article of manufacture a flexible, slender composite rod of indefinite length comprising a longitudinally extending central portion of normally solid, heat-fusible adhesive component too soft for coiling, storage and uncoiling and handling in a through feed melting and applying machine and a non-tacky, flexible, dimensionally stable, shape-retaining external layer of a different heat-fusible resinous material, resistant to degradation by exposure and surrounding said central portion and cooperating with said central portion to enable said composite rod to be coiled, stored and uncoiled and handled in said machine, the weight per unit length of said external layer and of said central portion being in substantially constant ratio throughout the length of said rod and the material of said central portion and said external layer constituting an adhesive when melted and mixed together.

2. An article of manufacture as defined in claim 1 in which the area of cross section of the external layer is from about 15% to about 50% of the total cross sectional area of the composite rod.

3. As an article of manufacture a flexible, slender composite rod of indefinite length comprising a longitudinally extending central portion of normally solid, heat-fusible adhesive component too tacky for coiling, storage and uncoiling and handling in a through feed melting and applying machine and a non-tacky, flexible, dimensionally stable, shape-retaining external layer of a different heat-fusible resinous material resistant to degradation by exposure and surrounding said central portion and cooperating with said central portion to enable said composite rod to be coiled, stored and uncoiled and handled in said machine, the weight per unit length of said external layer and of said central portion being in substantially constant ratio throughout the length of said rod and the material of said central portion and said external layer constituting an adhesive when melted and mixed together.

4. An article of manufacture as defined in claim 3 in which the area of cross section of the external layer is from about 15% to about 50% of the total cross sectional area of the composite rod.

5. As an article of manufacture a flexible, slender composite rod of indefinite length comprising a longitudinally extending central portion of normally solid, heat-fusible adhesive component too brittle for coiling, storage and uncoiling and handling in a through feed melting and applying machine and a non-tacky, flexible, dimensionally stable, shape-retaining external layer of a different heat-fusible resinous material resistant to degradation by exposure and surrounding said central portion and cooperating with said central portion to enable said composite rod to be coiled, stored and uncoiled and handled in said machine, the weight per unit length of said external layer and of said central portion being in substantially constant ratio throughout the length of said rod and the material of said central portion and said external layer constituting an adhesive when melted and mixed together.

6. An article of manufacture as defined in claim 5 in which the area of cross section of the external layer is from about 15% to about 50% of the total cross sectional area of the composite rod.

References Cited by the Examiner

UNITED STATES PATENTS

| 2,762,504 | 9/1956 | Sparks et al. | 206—84 |
| 2,975,150 | 3/1961 | Johnson et al. | 260—27 |

FOREIGN PATENTS 683,818   12/1952   Great Britain.

ALEXANDER WYMAN, *Primary Examiner.*
R. A. FLORES, *Assistant Examiner.*